(12) United States Patent
Miller

(10) Patent No.: US 6,445,854 B1
(45) Date of Patent: Sep. 3, 2002

(54) OPTICAL FIBER HAVING FIRST AND SECOND REFLECTIVE SURFACES AND METHOD OF OPERATION

(75) Inventor: Robert O. Miller, Carrollton, TX (US)

(73) Assignee: Optical Switch Corporation, Richardson, TX (US)

( * ) Notice: Subject to any disclaimer, the term of this patent is extended or adjusted under 35 U.S.C. 154(b) by 96 days.

(21) Appl. No.: 09/586,936

(22) Filed: Jun. 2, 2000

(51) Int. Cl.[7] .............................. G02B 6/26; G02B 6/42
(52) U.S. Cl. .............................. 385/38; 385/31; 385/47; 385/85; 385/88
(58) Field of Search ............................. 385/47, 85, 88, 385/39, 89, 38

(56) References Cited

U.S. PATENT DOCUMENTS

| | | | |
|---|---|---|---|
| 5,007,209 A | * 4/1991 | Saito et al. ................ 51/283 R |
| 5,097,524 A | * 3/1992 | Wasserman et al. .......... 385/73 |
| 5,101,457 A | * 3/1992 | Blonder et al. ............... 385/33 |
| 5,221,987 A | 6/1993 | Laughlin .................... 359/222 |
| 5,325,452 A | 6/1994 | Stein et al. .................... 385/67 |
| 5,345,323 A | * 9/1994 | Basavanhally et al. ....... 385/59 |
| 5,351,327 A | * 9/1994 | Lurie et al. .................... 385/78 |
| 5,412,747 A | * 5/1995 | Matsuoka et al. ............ 385/85 |
| 5,444,801 A | 8/1995 | Laughlin .................... 385/16 |
| 5,463,709 A | * 10/1995 | Terao et al. .................. 385/85 |
| 5,553,175 A | 9/1996 | Laughlin .................... 385/16 |
| 5,555,327 A | 9/1996 | Laughlin .................... 385/16 |
| 5,555,558 A | 9/1996 | Laughlin .................... 385/16 |
| 5,566,260 A | 10/1996 | Laughlin .................... 385/16 |
| 5,631,986 A | * 5/1997 | Frey et al. .................... 385/78 |
| 5,647,033 A | 7/1997 | Laughlin .................... 385/16 |
| 5,687,269 A | * 11/1997 | Furuya et al. ................ 385/85 |
| 5,831,743 A | * 11/1998 | Ramos et al. ................ 356/445 |
| 5,841,916 A | 11/1998 | Laughlin .................... 385/16 |
| 5,845,029 A | * 12/1998 | Matsuoka et al. ............ 385/84 |
| 5,875,271 A | 2/1999 | Laughlin .................... 385/16 |
| 5,878,178 A | * 3/1999 | Wach ........................... 385/55 |
| 5,909,301 A | 6/1999 | Laughlin .................... 359/222 |
| 5,917,641 A | 6/1999 | Laughlin .................... 359/222 |

OTHER PUBLICATIONS

Inventor: Richard H. Laughlin, U.S. patent application Ser. No. 09/111,455, entitled "Method and Apparatus for Aligning Optical Fibers", Optical Switch Corporation, pp. 1–43, drawings—11 pages, Jul. 8, 1998.

Inventor: Richard H. Laughlin, U.S. patent application Ser. No. 09/111,570, entitled "Method and Apparatus for Connecting Optical Fibers,", Optical Switch Corporation, pp. 1–40, drawings—11 pages, Jul. 8, 1998.

(List continued on next page.)

*Primary Examiner*—Cassandra Spyrou
*Assistant Examiner*—Leo Boutsikaris
(74) *Attorney, Agent, or Firm*—Baker Botts L.L.P.

(57) ABSTRACT

An optical fiber includes an endface having a first reflective surface and a second reflective surface. The first reflective surface is formed at a first bias angle with respect to a plane that is normal to the longitudinal axis of the optical fiber. The first reflective surface totally internally reflects an optical signal at a first reflection angle with respect to the longitudinal axis. The second reflective surface is coupled to the first reflective surface and formed at a second bias angle with respect to the plane such that the second reflective surface totally internally reflects the optical signal at a selected second reflection angle.

21 Claims, 2 Drawing Sheets

OTHER PUBLICATIONS

Inventor: Richard H. Laughlin, U.S. patent application Ser. No. 09/111,571, entitled "Method and Apparatus for Aligning Optical Fibers Using an Alignment Spacer", Optical Switch Corporation, pp. 1–46, drawings—11 pages, Jul. 8, 1998.

Inventor: Richard H. Laughlin, U.S. patent application Ser. No. 09/212,616, entitled "Frustrated Total Internal Reflection Bus and Method of Operation", Optical Switch Corporation, pp. 1–32, drawings—3 pages, Dec. 16, 1998.

Inventor: Richard H. Laughlin, U.S. patent application Ser. No. 09/244,570, entitled "System and Method for Determining the Condition of an Optical Switch", Optical Switch Corporation, pp. 1–32, drawings—3 pages, Feb. 4, 1999.

Inventors: Chris Karaguleff, et al., U.S. patent application Ser. No. 09/415,506, entitled "Frustrated Total Internal Reflection Switch Using Double Pass Reflection and Method of Operation", Optical Switch Corporation,, pp. 1–37, drawings—7 pages, Oct. 8, 1999.

Inventors: John G. Stanford, et al., U.S. patent application Ser. No. 09/483,742, entitled "System and Method for Beam–Steering Using a Reference Signal Feedback", Optical Switch Corporation, pp. 1–38, drawings—5 pages, Jan. 17, 2000.

* cited by examiner

OPTICAL FIBER HAVING FIRST AND SECOND REFLECTIVE SURFACES AND METHOD OF OPERATION

TECHNICAL FIELD OF THE INVENTION

This invention relates to the field of optics and more particularly to an optical fiber having first and second reflective surfaces.

BACKGROUND OF THE INVENTION

Fiber optic communication systems include optical components, such as optical fibers, that transmit and receive optical signals. An optical signal propagating through an input optical fiber may exit the input optical fiber at a particular angle for communication to an output optical fiber. The various optical components of a system, such as the optical fibers, are generally positioned with respect to each other using V-grooves, or other similarly pre-fabricated alignment tools. A problem with prior fiber optic communication systems is that the pre-fabricated alignment tools may not be able to support the output optical fiber in a position appropriate for receiving the optical signal from the input optical fiber. One approach to solve this problem attempts to custom manufacture alignment tools to accommodate optical fibers that receive optical signals at various angles. This approach is costly, time consuming, and inefficient.

SUMMARY OF THE INVENTION

An optical fiber having first and second reflective surfaces is provided that substantially eliminates or reduces disadvantages and problems associated with prior optical fibers.

In accordance with one embodiment of the present invention, an optical fiber includes an endface having a first reflective surface and a second reflective surface. The first reflective surface is formed at a first bias angle with respect to a plane that is normal to the longitudinal axis of the optical fiber. The first reflective surface totally internally reflects an optical signal at a first reflection angle with respect to the longitudinal axis. The second reflective surface is coupled to the first reflective surface and formed at a second bias angle with respect to the plane such that the second reflective surface totally internally reflects the optical signal at a selected second reflection angle.

Another embodiment of the present invention is a method of forming an endface of an optical fiber that includes forming a first reflective surface at a first bias angle with respect to a plane that is normal to the longitudinal axis of the optical fiber such that the first reflective surface totally internally reflects an optical signal at a first reflection angle with respect to the longitudinal axis. The method further includes forming a second reflective surface at a second bias angle with respect to the plane such that the second reflective surface totally internally reflects the optical signal at a selected second reflection angle.

Yet another embodiment of the present invention is a method for communicating an optical signal using an optical fiber. The method includes propagating an optical signal along the longitudinal axis of an optical fiber and totally internally reflecting the optical signal at a first reflective surface, wherein the first reflective surface is formed at a first bias angle with respect to a plane that is normal to the longitudinal axis of the optical fiber. The method further includes propagating the optical signal at a first reflection angle with respect to the longitudinal axis in response to totally internally reflecting the optical signal. The method concludes by totally internally reflecting the optical signal at a second reflective surface, wherein the second reflective surface is formed at a second bias angle with respect to the plane such that the optical signal propagates at a selected second reflection angle.

Technical advantages of the present invention include an optical fiber having an endface with a first reflective surface and a second reflective surface. The first reflective surface may be formed at a first bias angle that allows the incident angle of an optical signal to be sufficiently greater than the appropriate critical angle of refraction while still achieving a selected exit angle for the signal. This is accomplished by using a second reflective surface formed at a second bias angle to totally internally reflect the optical signal in the desired direction. The first bias angle and the second bias angle may be determined to achieve any suitable exit angle for the optical signal. In this respect, the bias angles of the first reflective surface and the second reflective surface may be chosen to minimize insertion losses and crosstalk and to maximize coupling efficiency between the optical fiber and any other optical components while still achieving a selected exit angle for the optical signal.

In one embodiment of the present invention, the first reflective surface and the second reflective surface may be formed such that the optical signal exits the optical fiber at an exit angle that is ninety degrees from the longitudinal axis of the optical fiber. In this respect, any optical component may be coupled to the optical fiber using any suitable alignment techniques and devices, such as any standard V-groove device that is limited to the (110) directions in (100) silicon.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying figures in which like reference numbers indicate like features and wherein.

DETAILED DESCRIPTION OF THE INVENTION

Figure 1:
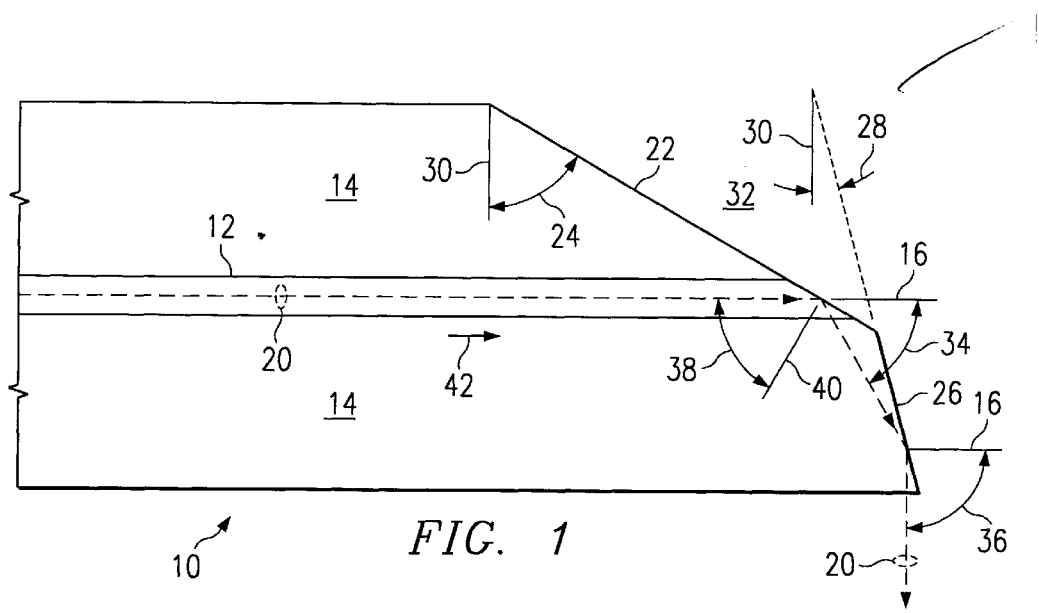
FIG. 1 illustrates an optical fiber having a first reflective surface and a second reflective surface in accordance with the present invention.

FIG. 1 illustrates an optical fiber 10 that includes a core 12 designed to transmit or receive information in the form of light pulses, such as an optical signal 20, and a cladding 14 that surrounds core 12 to prevent signal 20 from escaping core 12 during transmission. Optical fiber 10 further comprises a first reflective surface 22 and a second reflective surface 26. In general, first reflective surface 22 totally internally reflects optical signal 20 at a first reflection angle and second reflective surface 26 totally internally reflects optical signal 20 at a selected second reflection angle.

Core 12 of optical fiber 10 comprises any suitable refractive material, such as glass, having a particular index of refraction. Cladding 14 of optical fiber 10 comprises any suitable refractive material, such as glass, having an index of refraction lower than that of core 12 such that signal 20 propagates along the longitudinal axis 16 of optical fiber 10. Optical fiber 10 may comprise a multi-mode fiber having a large core (e.g., 50 or 62.5 microns wide) or a single mode fiber having a small core (e.g., 9 microns wide). Although the following description is detailed with reference to a fiber 10 having a circular cross section, it should be understood that the cross section of fiber 10 may have any suitable shape. Optical signal 20 comprises visible light, infrared radiation, ultraviolet radiation, or any other suitable optical beam.

First reflective surface 22 is formed at a first bias angle 24 measured counterclockwise with respect to a plane 30 that is normal to the longitudinal axis 16 of fiber 10. First reflective surface 22 forms an interface between optical fiber 10 and a refractive material 32. Refractive material 32 comprises air or any other suitable substance that has an index of refraction lower than that of core 12 of optical fiber 10. In general, optical signal 20 contacts first reflective surface 22 of fiber 10 at an incident angle 38 measured clockwise with respect to a vector 40 that is normal to reflective surface 22. Accordingly, if the incident angle 38 of signal 20 is equal to or above a critical angle of refraction associated with the interface between core 12 of fiber 10 and refractive material 32, then first reflective surface 22 totally internally reflects optical signal 20 at a first reflection angle 34 measured clockwise with respect to longitudinal axis 16. First reflective surface 22 of fiber 10 therefore reflects optical signal 20 by total internal reflection (TIR).

Second reflective surface 26 is formed at a second bias angle 28 measured counterclockwise with respect to plane 30. Second bias angle 28 is determined in response to first reflection angle 34 and/or first bias angle 24 in order to totally internally reflect optical signal 20 at a selected second reflection angle 36 measured clockwise with respect to longitudinal axis 16. Second reflection angle 36 may generally be referred to as exit angle 36 if signal 20 exits fiber 10 upon reflecting off second reflective surface 26. Although the description of FIG. 1 is detailed with reference to a first reflective surface 22 and a second reflective surface 26, it should be understood that fiber 10 may be formed having any suitable number and combination of reflective surfaces to achieve the appropriate exit angle 36 of signal 20.

In operation, optical fiber 10 propagates an optical signal 20 along the longitudinal axis 16 of fiber 10 in a direction indicated by arrow 42. The interface between first reflective surface 22 and refractive material 32 totally internally reflects optical signal 20 at first reflection angle 34. The interface between second reflective surface 26 and refractive material 32 totally internally reflects optical signal 20 at second reflection angle 36. In this respect, the interfaces formed by each of reflective surfaces 22 and 26 and refractive material 32 act in combination to totally internally reflect optical signal 20 such that signal 20 exits optical fiber 10 at a selected angle 36 measured clockwise with respect to longitudinal axis 16.

In one embodiment, as illustrated in FIG. 1, first bias angle 24 and second bias angle 28 are determined such that optical signal 20 exits fiber 10 at the selected exit angle 36. For example, particular applications of fiber 10 require that signal 20 exit fiber 10 in a particular direction, such as at a right angle to the longitudinal axis 16 of fiber 10, so that signal 20 may be received by another optical component, such as another optical fiber. Prior attempts to achieve a selected exit angle for signal 20 sought to include a single reflective surface 22 for totally internally reflecting signal 20. For example, a reflective surface 22 formed at a forty-five degree bias angle 24 could be used to achieve a right angle exit of signal 20 from fiber 10. A problem with this approach is that to achieve the selected exit angle for signal 20 the reflective surface 22 may have to be formed at a bias angle 24 that causes the incident angle 38 of signal 20 to be prohibitively close to the critical angle of refraction for signal 20. This results in a portion of signal 20 being totally internally reflected at surface 22 and another portion of signal 20 propagating through the interface between surface 22 and material 32. This, in turn, leads to poor optical coupling between fiber 10 and any other optical components.

A technical advantage provided by the present invention is that optical fiber 10 may be formed having a first reflective surface 22 at a first bias angle 24 that allows the incident angle 38 of signal 20 to be sufficiently greater than the appropriate critical angle of refraction while still achieving the selected exit angle 36 for signal 20. This is accomplished by using a second reflective surface 26 formed at a second bias angle 28 to totally internally reflect signal 20 in the desired direction. For example, optical fiber 10 may be formed having a first reflective surface 22 greater than forty-five degrees measured counterclockwise from plane 30 so that incident angle 38 is sufficiently greater than the appropriate critical angle of refraction, while still achieving a right angle exit of the totally internally reflected signal 20 from fiber 10 using a second reflection at second reflective surface 26.

In one embodiment, the appropriate angles 24 and 28 of surfaces 22 and 26, respectively, may be determined to achieve a selected exit angle 36. The relationship between angles 24, 28, and 36 may be modeled, in one embodiment, according to the following exit angle equation:

$$C=(2*A)-(2*B)$$

Where:
  C=exit angle 36 of signal 20 measured clockwise from longitudinal axis 16;
  A=first bias angle 24 of surface 22 measured counterclockwise from plane 30; and
  B=second bias angle 28 of surface 26 measured counterclockwise from plane 30.

Figure 2A:
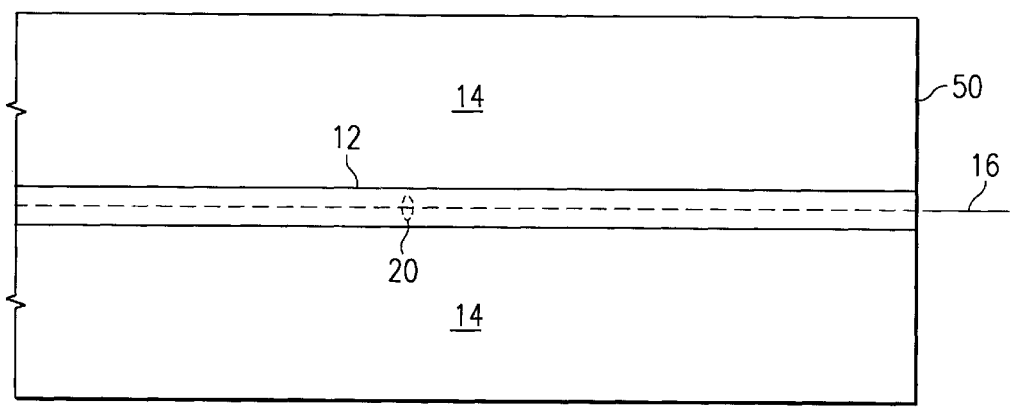
FIGS. 2A–2D illustrate a method of forming an endface of an optical fiber in accordance with the present invention.

FIGS. 2A–2D illustrate a method for forming an endface of fiber 10 having a first reflective surface 22 and a second reflective surface 26. Referring to FIG. 2A, an optical fiber 10 includes an endface 50 that is generally normal to the longitudinal axis 16 of fiber 10, despite any localized variations or deviations. An optical signal 20 propagating in a direction indicated by arrow 42 would generally exit fiber 10 in that direction before diverging into free space. To control the exit angle of signal 20 such that signal 20 exits in a direction other than that of arrow 42, reflective surfaces 22 and 26 may be formed in endface 50 of fiber 10.

Figure 2B:
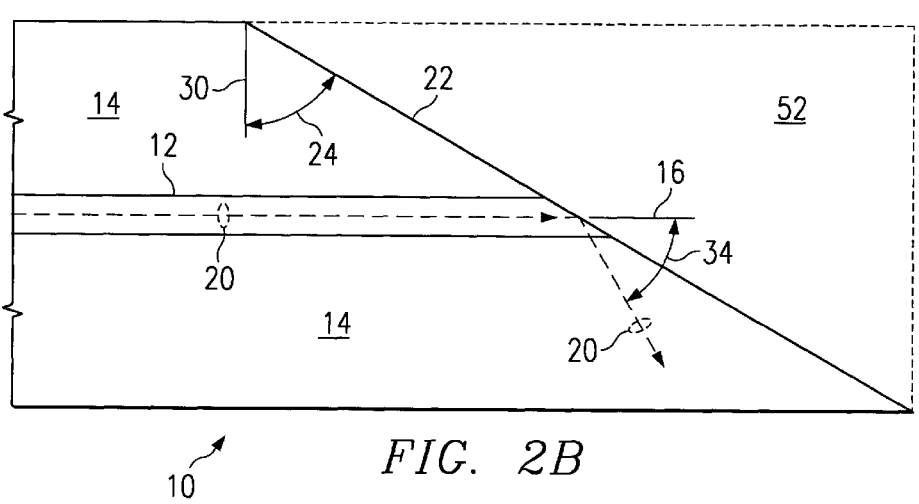

Referring to FIG. 2B, a portion 52 of fiber 10 may be polished, etched, cut, or otherwise removed so that a first reflective surface 22 is formed at bias angle 24 measured counterclockwise with respect to plane 30. Surface 22 may be formed at a bias angle 24 such that the interface between surface 22 and material 32 totally internally reflects signal 20 at a first reflection angle 34 measured clockwise with respect to longitudinal axis 16.

Figure 2C:
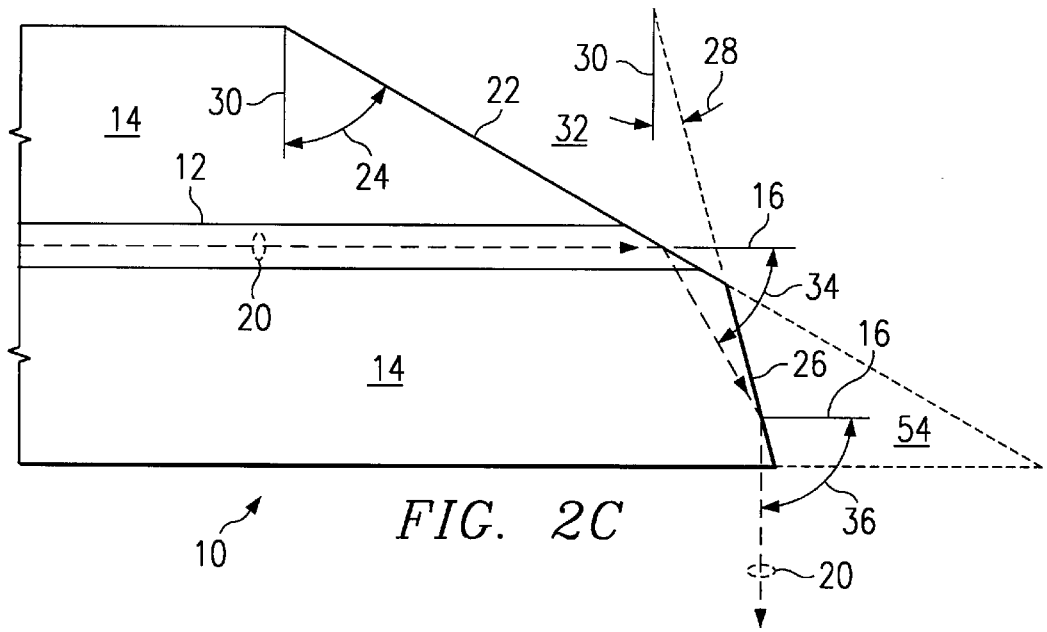

Referring to FIG. 2C, a portion 54 of fiber 10 is polished, etched, cut, or otherwise removed so that second reflective surface 26 is formed at second bias angle 28. The second bias angle 28, at which surface 26 is formed, may be determined based upon the value of angle 24 and the desired exit angle 36 of signal 20 using the exit angle equation described above. For example, the desired exit angle 36 of signal 20 may be ninety degrees measured clockwise from longitudinal axis 16 of fiber 10 and the first reflective surface 22 may be formed at a sixty degree angle measured counterclockwise with respect to plane 30. These values for angles 24 and 36 may be chosen to minimize insertion losses and crosstalk and to maximize coupling efficiency between fiber 10 and any other optical components while still achieving a right angle exit of signal 20 from fiber 10. Given these values for the exit angle 36 and the first bias angle 24, the second bias angle 28 of surface 26 may be determined to be fifteen degrees measured counterclockwise with respect to plane 30, according to the exit angle equation described above. In this respect, the exit angle equation may be used to determine any of angles 24, 28 or 36 given a chosen value for the other two angles.

Although FIGS. 2A–2D illustrate the formation of surface 22 prior to the formation of surface 26, it should be understood that surfaces 22 and 26 may be formed in any suitable order without deviating from the scope of the present invention. A technical advantage of forming surface 26 prior to forming surface 22 is that it reduces complexities associated with polishing fragile, sharply angled portions of fiber 10 that may chip away or break during the manufacturing process if surface 22 is formed before surface 26. Even if surface 26 is formed prior to surface 22, angle 28 of surface 26 may still be determined based upon angles 24 and 36 according to the exit angle equation described above.

Figure 2D:
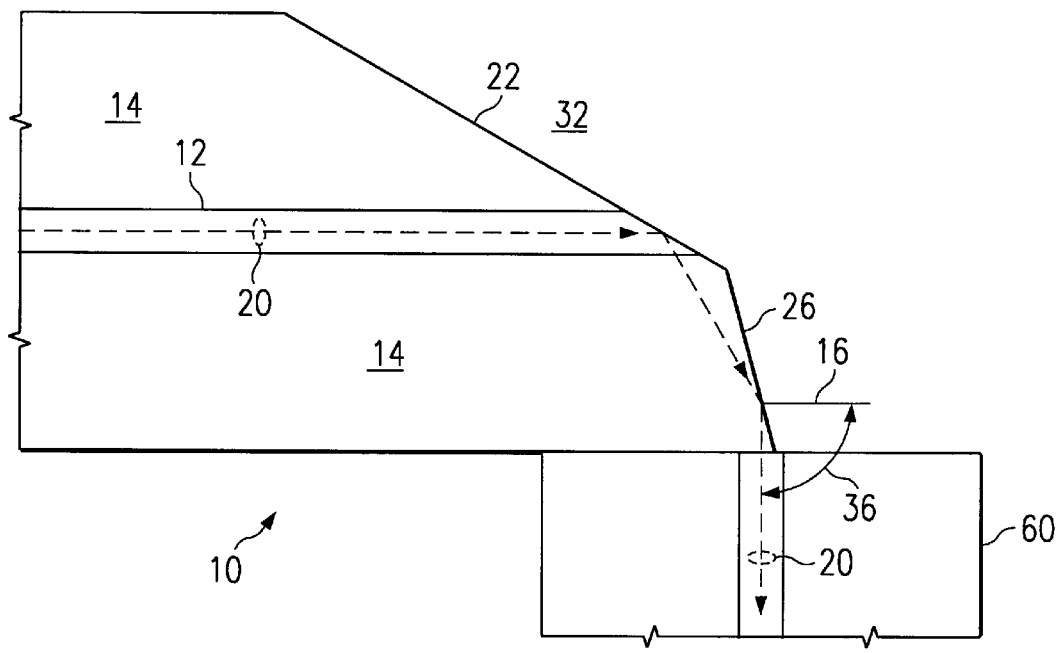

Referring to FIG. 2D, an optical component 60, such as another optical fiber or any other optical device, may be aligned with optical fiber 10 such that optical component 60 receives signal 20 at exit angle 36. In this respect, fiber 10 and optical component 60 may form a portion of an optical switch used to selectively communicate signal 20 between a number of outputs. A technical advantage of the present invention is that angle 24 may be formed such that incident angle 38 is greater than the critical angle of refraction while still maintaining a selected exit angle 36 for signal 20. This is accomplished using second reflective surface 26 to totally internally reflect signal 20 in the desired direction. This configuration of surfaces 22 and 26 supports efficient optical coupling between fiber 10 and an optical component 60. In one embodiment, surfaces 22 and 26 may be formed such that signal 20 exits fiber 10 at an exit angle 36 that is ninety degrees measured clockwise from longitudinal axis 16. In this respect, component 60 may be coupled to fiber 10 using any suitable alignment techniques and devices, such as any standard V-groove device that is limited to the (110) directions in (100) silicon.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An optical fiber having an endface, the endface comprising:
    a first reflective surface formed at a first bias angle with respect to a plane that is normal to the longitudinal axis of the optical fiber, the first reflective surface operable to totally internally reflect an optical signal at a first reflection angle with respect to the longitudinal axis; and
    a second reflective surface coupled to the first reflective surface and formed at a second bias angle with respect to the plane such that the second reflective surface totally internally reflects the optical signal which exits the optical fiber at a selected second reflection angle.

2. The optical fiber of claim 1, wherein the second reflection angle with respect to the longitudinal axis of the optical fiber is a right angle.

3. The optical fiber of claim 1, wherein the second reflection angle is proportional to the difference between the first bias angle and the second bias angle.

4. The optical fiber of claim 1, wherein the second bias angle is determined based upon the selected second reflection angle and the first bias angle.

5. The optical fiber of claim 1, wherein the second bias angle is determined based upon the selected second reflection angle and the first reflection angle.

6. The optical fiber of claim 1, wherein the optical fiber comprises a single mode fiber.

7. The optical fiber of claim 1, wherein the selected second reflection angle with respect to the longitudinal axis of the optical fiber is a right angle and the second bias angle is formed at an angle substantially equal to the amount by which the first bias angle exceeds forty-five degrees as measured from the plane.

8. A method of forming an endface of an optical fiber, comprising:
    forming a first reflective surface at a first bias angle with respect to a plane that is normal to the longitudinal axis of the optical fiber such that the first reflective surface totally internally reflects an optical signal at a first reflection angle with respect to the longitudinal axis; and
    forming a second reflective surface at a second bias angle with respect to the plane such that the second reflective surface totally internally reflects the optical signal which exits the optical fiber at a selected second reflection angle.

9. The method of claim 8, wherein the step of forming the second reflective surface comprises determining the second bias angle based upon the selected second reflection angle and the first bias angle.

10. The method of claim 8, wherein forming the second reflective surface comprises determining a second bias angle based upon the selected second reflection angle and the first reflection angle.

11. The method of claim 8, wherein the step of forming the second reflective surface is performed prior to forming the first reflective surface.

12. The optical fiber of claim 8, wherein the second reflection angle with respect to the longitudinal axis of the optical fiber is a right angle.

13. The method of claim 8, wherein the optical fiber comprises a single mode fiber.

14. The method of claim 8, wherein:
    the step of forming the first reflective surface comprises polishing a first portion of the optical fiber at the first bias angle; and
    the step of forming the second reflective surface comprises polishing a second portion of the optical fiber at the second bias angle.

15. The method of claim 8, wherein the selected second reflection angle with respect to the longitudinal axis of the optical fiber is a right angle and the step of forming the second reflective surface comprises forming the second reflective surface such that the second bias angle is substantially equal to the amount by which the first bias angle exceeds forty-five degrees as measured from the plane.

16. A method for communicating an optical signal using an optical fiber, comprising:

propagating an optical signal along the longitudinal axis of an optical fiber;

totally internally reflecting the optical signal at a first reflective surface, wherein the first reflective surface is formed at a first bias angle with respect to a plane that is normal to the longitudinal axis of the optical fiber;

propagating the optical signal at a first reflection angle with respect to the longitudinal axis in response to totally internally reflecting the optical signal; and totally internally reflecting the optical signal at a second reflective surface, wherein the second reflective surface is formed at a second bias angle with respect to the plane such that the optical signal exits the optical fiber at a selected second reflection angle.

17. The method of claim 16, wherein the second reflection angle with respect to the longitudinal axis of the optical fiber is a right angle.

18. The method of claim 16, wherein the second reflection angle is proportional to the difference between the first bias angle and the second bias angle.

19. The method of claim 16, wherein the second bias angle is determined based upon the selected second reflection angle and the first bias angle.

20. The method of claim 16, wherein the second bias angle is determined based upon the selected second reflection angle and the first reflection angle.

21. The optical fiber of claim 16, wherein the selected second reflection angle with respect to the longitudinal axis of the optical fiber is a right angle and the second bias angle is formed at an angle substantially equal to the amount by which the first bias angle exceeds forty-five degrees as measured from the plane.

* * * * *